(12) United States Patent
Plummer

(10) Patent No.: US 9,097,060 B1
(45) Date of Patent: Aug. 4, 2015

(54) BIOFOAM DOOR

(71) Applicant: GLASSCRAFT DOOR COMPANY, Houston, TX (US)

(72) Inventor: John B. Plummer, Houston, TX (US)

(73) Assignee: GLASSCRAFT DOOR COMPANY, Houston, TX (US)

( * ) Notice: Subject to any disclaimer, the term of this patent is extended or adjusted under 35 U.S.C. 154(b) by 0 days.

(21) Appl. No.: 14/502,789

(22) Filed: Sep. 30, 2014

Related U.S. Application Data

(62) Division of application No. 14/297,460, filed on Jun. 5, 2014, now Pat. No. 8,875,402.

(60) Provisional application No. 61/866,009, filed on Aug. 14, 2013.

(51) Int. Cl.
| E06B 5/20 | (2006.01) |
| E06B 3/263 | (2006.01) |
| B29L 31/10 | (2006.01) |
| B29C 45/14 | (2006.01) |
| B29C 45/00 | (2006.01) |
| B29C 45/16 | (2006.01) |
| E04C 2/20 | (2006.01) |
| E04B 1/86 | (2006.01) |
| B29L 9/00 | (2006.01) |
| B29L 31/00 | (2006.01) |
| E06B 3/70 | (2006.01) |

(52) U.S. Cl.
CPC .............. *E06B 5/20* (2013.01); *B29C 45/0001* (2013.01); *B29C 45/14508* (2013.01); *B29C 45/14795* (2013.01); *B29C 45/14811* (2013.01); *B29C 45/1671* (2013.01); *E04B 1/86* (2013.01); *E04C 2/205* (2013.01); *B29C 2045/1454* (2013.01); *B29L 2009/00* (2013.01); *B29L 2031/724* (2013.01); *E06B 2003/26378* (2013.01); *E06B 2003/7023* (2013.01)

(58) Field of Classification Search
CPC ........... B21D 47/04; B23P 15/00; B32B 5/18; B32B 5/20; B29C 44/02; B29C 44/04; B29C 44/06; B29C 44/022; B29C 44/1228; B29C 44/1242; B29C 45/14795; B29C 45/14811; B29C 45/1671; B29C 45/14508; B29C 45/0001; B29C 2045/1454; E04C 2/384; E04C 2/296; E04C 2/205; E04B 1/14; E04B 1/86; E06B 3/725; E06B 3/78; E06B 5/20; F25D 23/028; F06B 2003/7023; C08K 3/36; C08J 2375/04; C08G 2101/0083; C08G 2105/02; B29L 2009/00; B29L 2031/724
See application file for complete search history.

(56) References Cited

U.S. PATENT DOCUMENTS

| 4,764,238 A | * | 8/1988 | Dastin et al. .................. 156/245 |
| 5,142,835 A | * | 9/1992 | Mrocca ....................... 52/309.12 |
| 8,449,946 B2 | | 5/2013 | Kurth et al. |
| 2010/0279101 A1 | | 11/2010 | Cageao et al. |

(Continued)

*Primary Examiner* — Sarang Afzali
(74) *Attorney, Agent, or Firm* — Buskop Law Group, PC; Wendy Buskop

(57) ABSTRACT

A low volatile organic emission method for making a door using a liquid hardenable flowable biofoam formulation. The liquid hardenable flowable biofoam formulation expands upon contact with a blowing agent forming a foam, wherein the liquid hardenable flowable biofoam formulation is formed from plant materials, and a door formed from the method. The method forms a door with sound deadening qualities, increased impact resistance, and resistance to burning and capable of sustaining at least hurricane force winds without deforming.

10 Claims, 3 Drawing Sheets

(56) References Cited

U.S. PATENT DOCUMENTS

2010/0310823 A1   12/2010   Albertelli et al.
2011/0061322 A1   3/2011    Wang Chen
2014/0163128 A1*  6/2014    Brown .......................... 521/170

* cited by examiner

FIGURE 3

| | |
|---|---|
| CREATING A FRAME WITH A FRONT SIDE AND A BACK SIDE | 300 |
| POSITIONING A FIRST POLYMER SKIN OVER THE FRONT SIDE | 302 |
| POSITIONING A SECOND POLYMER SKIN OVER THE BACK SIDE, WHEREIN THE FIRST AND SECOND POLYMER SKINS ARE SPACED APART A WIDTH OF THE FRAME | 304 |
| INJECTING A LIQUID HARDENABLE FLOWABLE BIOFOAM BETWEEN THE FIRST POLYMER SKIN AND SECOND POLYMER SKIN AND THE FRAME | 306 |
| WAITING ONE MINUTE TO ONE HOUR WHILE THE LIQUID HARDENABLE FLOWABLE BIOFOAM EXPANDS WITHIN THE FRAME AND POLYMER SKINS ELIMINATING THE FORMATION OF CAVITIES BETWEEN THE FIRST AND SECOND POLYMER SKINS AND THE FRAME, BONDING THE FRAME AND POLYMER SKINS TO THE EXPANDED BIOFOAM | 308 |
| ALLOWING THE EXPANDED BIOFOAM TO HARDEN INTO A SECURE BOND BETWEEN THE EXPANDED BIOFOAM, THE FRAME AND THE POLYMER SKINS | 310 |

FIGURE 4

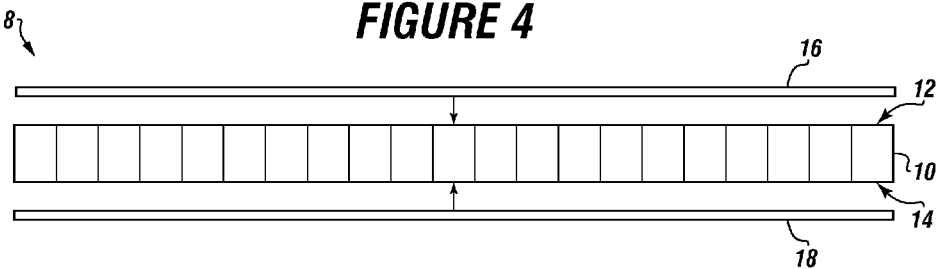

BIOFOAM DOOR

CROSS REFERENCE TO RELATED APPLICATIONS

The present application is a Divisional and claims priority to U.S. patent application Ser. No. 14/297,460 filed on Jun. 5, 2014, now U.S. Pat. No. 8,875,402, entitled "METHOD FOR MAKING A DOOR WITH A BIOFOAM", which claims priority to and the benefit of U.S. Provisional Patent Application Ser. No. 61/866,009 filed on Aug. 14, 2013, entitled "METHOD FOR MAKING A DOOR WITH A BIOFOAM". This reference is hereby incorporated in its entirety.

FIELD

The present embodiments generally relate to a door made by a low volatile organic emission method using a foam that is generally non-toxic to the environment while creating a high insulation sound deadening door.

BACKGROUND

A need exists for a door that uses a foam that uses plant materials rather than hydrocarbons to produce an insulated synthetic door with a smaller carbon footprint than currently available doors and produces low volatile organic emissions.

The present embodiments meet these needs.

BRIEF DESCRIPTION OF THE DRAWINGS

The detailed description will be better understood in conjunction with the accompanying drawings as follows:

FIG. 3 depicts a sequence of steps used to form the door according to an embodiment of the method.

FIG. 4 depicts a side view of the door with a frame.

Figure 1:
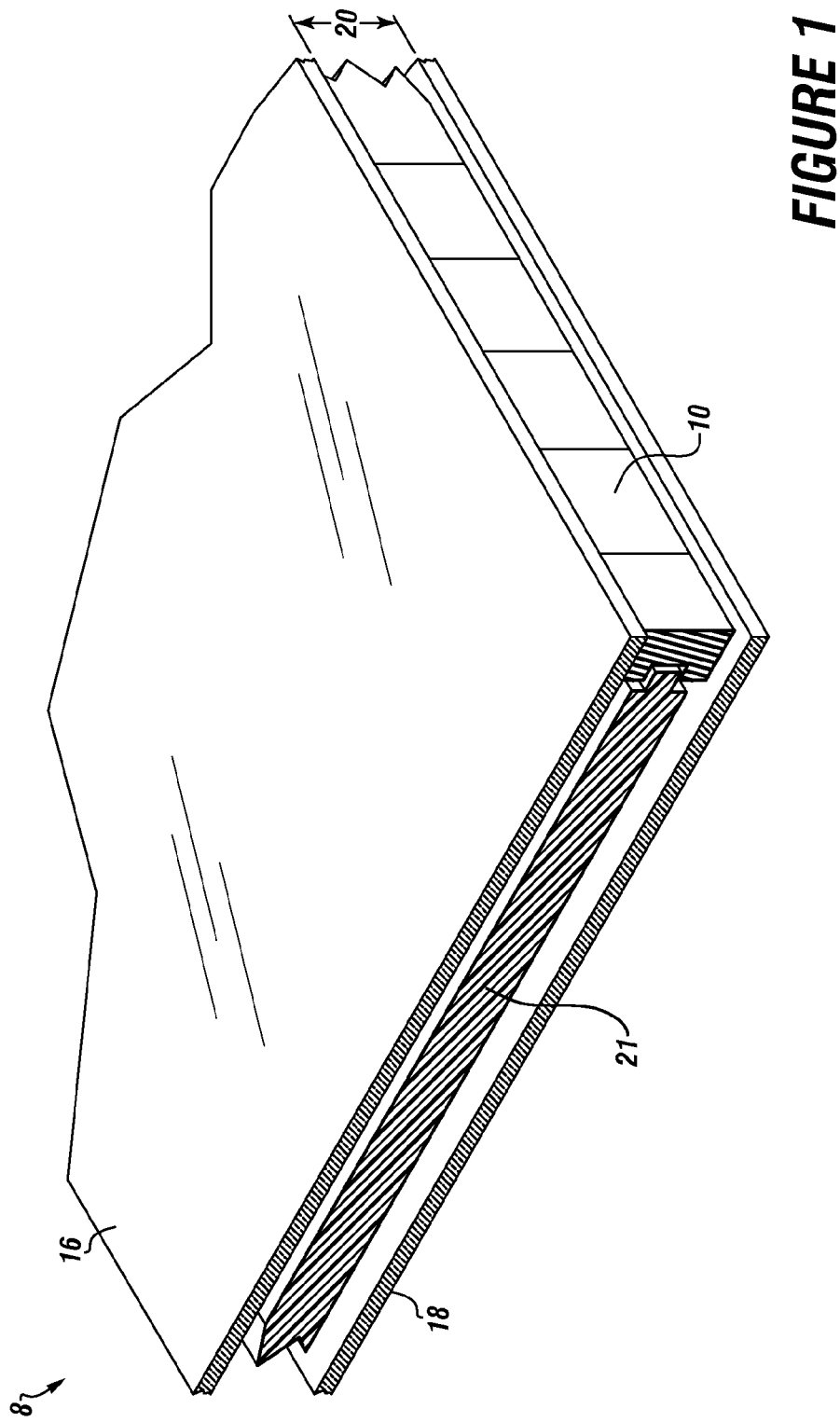
FIG. 1 depicts a cutaway view of the door with the biofoam expanding to form the expanded biofoam contained therein.

The present embodiments are detailed below with reference to the listed Figures.

DETAILED DESCRIPTION OF THE EMBODIMENTS

Before explaining the present method in detail, it is to be understood that the method is not limited to the particular embodiments and that they can be practiced or carried out in various ways.

The present embodiments generally relate to a method for making an insulated synthetic door using a foam that is formed from plant material while creating a high insulation sound deadening door, creating an insulated door with a smaller carbon footprint that produces a door without using toluene, pentane, or styrene.

The method for making the door reduces off-gassing of volatile components compared to current commercial practices.

The novel inventive method for making a door produces at least 15 percent lower toxic gas emissions than current methods. The inventive method has this lower emission rate as it does not require the use of toluene, pentanes, or styrenes in the production of the door.

The insulating features of the synthetic door with unique foam will save and conserve energy, will not pollute the environment, and will provide a healthier work environment.

The insulated sound deadening door adds significant insulation value to a house, reducing house energy needs which saves money for the homeowner.

The insulated door of the invention uses less fossil fuel that other door making systems by successfully using plant based oils in the processing of the door, rather than solely using hydrocarbon based materials to create the insulating properties of the door.

The method is not limited to the particular chemical formulation of the foam with plant oils.

The biofoams usable in with the method are foams that are formed from a reaction between isocyanates and polyols. In embodiments, the foam can be rigid.

The doors using the biofoam have the additional benefit of no measurable moisture absorption.

The doors formed with the biofoam have twice the R value of traditional EPS foam of the same thickness. No volatile organic chemicals are emitted during curing of the foam. As an additional benefit, the formed doors with the biofoam do not burn as easily.

The novel foam starts as a liquid, flows into spaces between door skins, and then has insulation properties after it expands, mainly due to a closed cell foam final form.

Most fiberglass and steel exterior doors use a rigid polyurethane foam as the core of the door.

Most doors are currently made with rigid polyurethane foams that typically utilize a toxic chemical called "toluene diisocyanate" for a portion of their formulation commonly known as the "A-side" of the formulation, as to create the foam, is a two-part reaction. In contrast, the present invention is not as toxic a process, protecting the atmosphere breathed by elderly people and children.

Toluene diisocyanate is a highly toxic organic compound with serious health risks to any home near a manufacturing plant using the chemical if it is accidently released.

The inventive method to make doors avoids the use of toluene.

The second portion of the foam is typically known as the "B-side" and is formed from polyols that are derived from petroleum. Polyols also release volatile organic compounds into the atmosphere if not properly contained.

Most polyurethane foam is produced through a reaction of the diisocyanate (the A-side) with the polyol (the B-side), using a catalyst and typically other additives.

Traditional polyurethane foam depletes fossil fuel reserves and in its use in door production, releases volatile organic compounds which can enter the atmosphere if an excursion occurs.

Most current commercial foam products do not have environmentally friendly blowing agents, as in the current invention.

Current inventive blowing agents include air, oxygen and water. The environmentally friendly blowing agents are dramatically different from current commercially used blowing agents, which include pentanes, hydrogen chloride, calcium hypochlorite or Freon. These pentanes and freons are known to contribute to global warming and human allergic reactions.

The new improved foam of the invention utilizes stable, far less toxic methylene-based isocyanate (MDI) for the A-side, and polyols derived from plant-based renewable, non-fossil fuel sources such as soy, castor, jatropha or even algae for the B-side.

The resulting foams are dimensionally stable and do not provide toxic off-gassing.

Another benefit of the current invention is that this unique foam enables a door to be produced in a work environment that is far safer than current environments, and significantly protects workers from volatile organic compounds and hazardous air pollutants.

The foam in embodiments can be made from 40 percent to 60 percent of a plant based oil, such as soy oil.

The synthetic door of the present method can be formed using a frame with hollow spaces. A front polymer skin and a back polymer skin can be formed and then installed over the frame. The liquid phase of the foam can then be injected into the hollow spaces between the polymer skins and the frame, allowed to expand. While expanding, the heat of the exothermic reaction can be used to accelerate curing of other components, glues, and epoxy used in the door manufacturing process.

The polymer skins can be prepared using a compression molding process and a molding compound which can be a curable polyester resin.

Alternatively, the polymer skins can be prepared using a vacuum formed thermoplastic skin.

In another embodiment, the polymer skins can be prepared using a reaction injection molding process and a curable polyester resin.

The steps of the method for making a door, which can be an insulated impact resistant door, can be better understood by looking at the parts of the door.

Turning now to the Figures, FIG. 1 depicts the parts of the door used in the method.

The method can be used to form a door 8 by first using a frame 10 with a front side and a back side. A first polymer skin 16 can be positioned over the front side of the frame. A second polymer skin 18 can be positioned over the back side. The first and second polymer skins can be spaced apart a width 20 of the frame.

The polymer skins can be made from molded sheets of fiberglass. In embodiments the polymer skins can be made from polyester based fiberglass. In other embodiments, the polymer skins can be made from molded polymers, such as acrylonitrile butadiene styrene (ABS), polypropylene, blends of polypropylene and ethylene, crosslinked materials for propylene, and ethylene.

The frame, in an embodiment, can be wood or a polymer composite. The frame can be 100 percent fiberglass or 100 percent graphite polymer in other embodiments.

A liquid hardenable flowable biofoam can be injected between the first polymer skin and second polymer skin while the polymer skins are attached to the frame 10. The liquid hardenable flowable biofoam can be injected during an injection period that lasts only about 2 seconds to about 60 seconds. The foam expansion time period can also be very short, lasting from only 1 minute to 10 minutes.

Following initial injection, the catalyst in the liquid hardenable flowable biofoam can cause the liquid to expand towards the first polymer skin, second polymer skin and frame forming an expanded biofoam.

The expanded biofoam 21 is shown between the polymer skins 16 and 18 and the frame 10.

Examples of usable liquid hardenable flowable biofoam can include a foam with an 18 percent bio-mass content. The bio-mass content can range from 8 weight percent to 48 weight percent of biomass based on the total liquid hardenable flowable biofoam.

In an embodiment, the liquid hardenable flowable biofoam can be 20 weight percent to 60 weight percent of a polyol.

The polyol used herein can be made from 8 percent to 92 percent of a plant based oil based on the total liquid hardenable flowable biofoam formulation. The other portion of the polyol can be petroleum based component.

The plant based oil can be a castor oil, a soy oil, a palm oil, a peanut oil, a cotton oil, a jatropha oil, an algae oil, or combinations thereof.

The liquid hardenable flowable biofoam can have 0.75 weight percent to 1.2 weight percent of a catalyst. Amine catalysts and metal catalysts can be used herein. For example, a diethanol amine can be a usable catalyst. A di-butyl tin dilurate metal catalyst can be usable herein.

The liquid hardenable flowable biofoam can have 2 weight percent to 6 weight percent of a blowing agent which can be water or distilled water. Hydrochloro flouro ethane is an example of a usable blowing agent. Blowing agents usable herein are also known as pneumatogens. Hydrocarbons can be used as blowing agents, such as pentanes, or cyclopentanes given the small weight percent needed. In embodiments, gasses can be used a blowing agent, such as oxygen or air.

The liquid hardenable flowable biofoam can have 1.1 weight percent to 1.4 weight percent of a surfactant, such as detergent. Silicon surfactants can be usable herein.

The liquid hardenable flowable biofoam can have 36 weight percent to 55 weight percent of an isocyanate.

Diphenylmethane isocyanate (MDI) and toluene diisocyanate (TDI) are usable herein.

Another usable isocyanate can be methylene diphenyl. The isocyanates can react with the blowing agents to create the expanded foam material.

The isocyanate reacts with the blowing agent, such as water to create the biofoam creating an exothermic reaction as the foam expands.

In another embodiment, an antioxidant can be added to the liquid hardenable flowable biofoam before inserting into the frame. 0.2 weight percent to 10 weight percent of antioxidant can be added to the foam to prevent degradation of the color used in the biofoam. An exemplary antioxidant can be IRGANOX 1076™, LOWILITE™, and NAUGARD™.

In an embodiment, 0.2 weight percent to 10 weight percent of a filler can be added to the liquid hardenable flowable biofoam formulation, including at least one of: an ash, a perlite, a clay, a silica, a biomass, a starch, a diatomaceous earth and a calcium carbonate.

The term "biomass" as used herein refers to straw, ground pecan shells, cellulosic materials, silage, ground peanut shells, talc, and ground bagasse.

In an embodiment, 0.1 weight percent to 1.4 weight percent of a crosslinking agent can be used, such as triethanol amine, diethanol amine, ethanol glycol, or combinations thereof.

The mixture can be flowed into the spaces in the frame between the first and second polymer skins using a viscosity from 150 centipoise to 10,000 centipoise.

The mixture can be flowed into the spaces as quickly as 15 seconds to as long as 90 seconds to fill the spaces in the frame between the first and second polymer skins.

After about 1 minute to 20 minutes, the liquid hardenable flowable biofoam expands within the hollow spaces in the frame and touches the edges of the polymer skins, eliminating the formation of cavities between the first and second polymer skins and the frame, bonding the frame and polymer skins.

In embodiments, the time for expanding the liquid hardenable flowable biofoam can be 2 minutes to 6 minutes.

As the liquid hardenable flowable biofoam expands, the temperature of the expanding foam can range from 80 degrees Fahrenheit to 250 degrees Fahrenheit during a 5 minute interval when the liquid hardenable flowable biofoam formulation material expands into the expanded biofoam.

The expanded biofoam stiffens into a rigid but secure bond between the expanded biofoam, frame and polymer skins.

In embodiments, the expanded biofoam can be rigid foam that does not bend.

In an embodiment, the biofoam can be a two-part foam that expands and hardens upon mixing each of the two parts together. The first part can be a blend of polyol, catalyst, blowing agent, and surfactant. The second part is the isocyanate. If a two part mix is used, mixing of the two parts can occur from 2 milliseconds to 2 minutes prior to entering the space between the first polymer skin and second polymer skin.

In embodiments, the mixing can be performed with an impingement mixing system, such as those mixing systems made by Graco Inc. of Minneapolis, Minn.

In embodiments, the biofoam to door skin bond can have a tensile strength that can withstand hurricane force winds, and prevent elderly people and children from being hurt by a door that blows apart in a hurricane.

Figure 2:
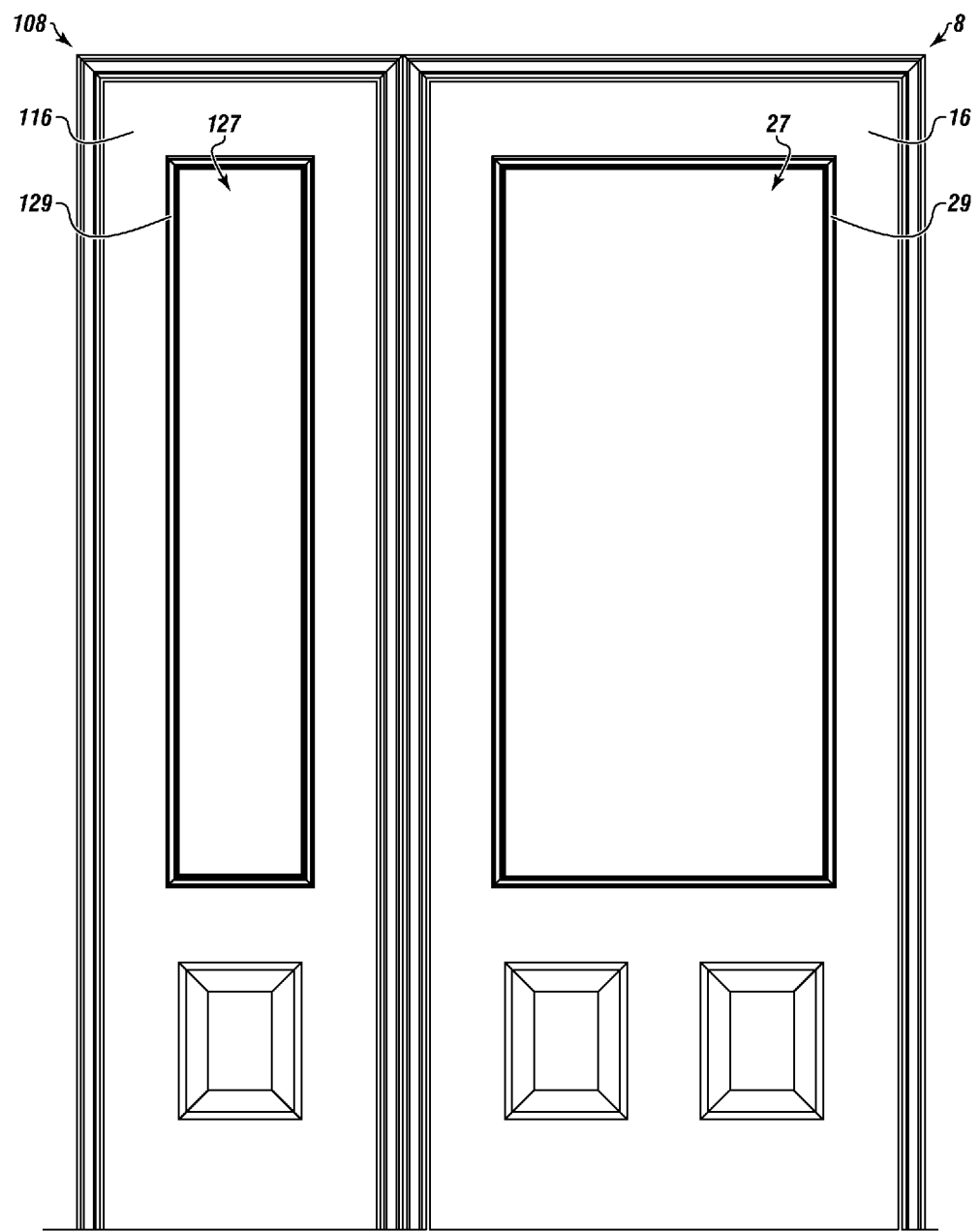
FIG. 2 depicts a door formed by the method with a side light.

FIG. 2 depicts a door formed by the method with biofoam adjacent a side light.

The door 8 can have a first polymer skin 16 and an opening 27 with an opening frame 29 for holding glass.

The door can have a width from 20 inches to 48 inches, a height from 78 to 98 inches, and a thickness ranging from 1 and 3/8 inches to 2 and 1/4 inches with the expanded biofoam.

In an embodiment, the first and second polymer skins can have aligned openings that function as a door light.

A side light 108 is shown adjacent the door 8. The side light 108 can be produced using the same method as the door.

The side light 108 can have a side light opening 127 with a side light opening frame 129, and a side light first polymer skin 116.

FIG. 3 depicts the steps of the method.

The method can include creating a frame with a front side and a back side, as shown in step 300.

The method can include positioning a first polymer skin over the front side, as shown in step 302.

The method can include positioning a second polymer skin over the back side, wherein the first and second polymer skins are spaced apart a width of the frame, as shown in step 304.

The method can include injecting a liquid hardenable flowable biofoam between the first polymer skin and second polymer skin and the frame, as shown in step 306.

The method can include waiting 1 minute to 1 hour while the liquid hardenable flowable biofoam expands within the frame and polymer skins eliminating the formation of cavities between the first and second polymer skins and the frame, bonding the frame and polymer skins to the expanded biofoam, as shown in step 308.

The method can include allowing the expanded biofoam to harden into a secure bond between the expanded biofoam, the frame and the polymer skins, as shown in step 310.

FIG. 4 depicts a side view of the door.

The door 8 can include a frame 10 with a front side 12 and a back side 14.

The door 8 can have a first polymer skin 16 positioned over the front side 12 and a second polymer skin 18 positioned over the back side 14.

The invention includes another method for making a biofoam insulated door.

The steps of this additional method can include forming a liquid hardenable flowable biofoam formulation comprising the same formulation as the liquid hardenable flowable biofoam formulation of the first method, namely: a 20 weight percent to 60 weight percent polyol with at least one of: a biomass content from 8 weight percent to 48 weight percent based on the total liquid hardenable flowable biofoam formulation; and a plant based oil content from 8 weight percent to 92 weight percent based on the total liquid hardenable flowable biofoam formulation; 0.75 weight percent to 1.2 weight percent of a catalyst based on the total liquid hardenable flowable biofoam formulation, wherein the catalyst is at least one of an amine catalyst or a metal catalyst; 2.0 weight percent to 6.0 weight percent of a blowing agent of at least one of air, oxygen, and water; 1.1 weight percent to 1.4 weight percent of a surfactant; and 36 weight percent to 55 weight percent of an isocyanate.

It should be noted that methlyenediphenyl diisocyanate which is less toxic with low human toxicity and low ecological risk or impact and does not contain toluene is particularly usable in this inventive method.

This particular diisocyanate can help consumers save on their heating and cooling costs and conserve energy.

For this method, usable polyols can include soy, castor or jatropha, all made from plant oil. This method is particularly usable using 36 weight percent castor oil in the polyol.

The next step can involve positioning a first polymer skin having a door shape on a surface. A door frame with a door shape can then be laid over the first polymer skin.

The next step can involve injecting the liquid hardenable flowable biofoam formulation between the first polymer skin and the frame for a period of time from 2 seconds to 60 seconds.

Next, a second polymer skin can be positioned over the frame containing the injected liquid hardenable flowable biofoam formulation.

In this embodiment, the first and second polymer skins can be spaced apart a width equivalent to a width of the frame.

The next step can involve waiting 1 minute to 10 minutes while the liquid hardenable flowable biofoam expands within the frame and bonds to the first and second polymer skins forming an expanded biofoam that simultaneously eliminates the formation of cavities between the first and second polymer skins and the frame, bonding the frame and the first and second polymer skins together simultaneously; forming a door with increased sound deadening properties and increased insulation properties that is produced without toluene, pentane, or styrene.

In embodiments, depending on the amount of blowing agent used, the free rise density of the hardened biofoam can be about 1.7 lb per cubic foot. In other embodiments, the hardened biofoam can generate a density to 2 lb per cubic foot.

In embodiments, the color of the pigment or dye used can be a non-toxic green, red, yellow or blue or combinations of these colors.

In other embodiments, the free rise density of the hardened biofoam can range from 1.5 lb per cubic foot to up to 10 lb per cubic foot.

The invention includes a biofoam insulated door made by both of the methods described herein.

While these embodiments have been described with emphasis on the embodiments, it should be understood that within the scope of the appended claims, the embodiments might be practiced other than as specifically described herein.

What is claimed is:

1. A biofoam door made by a method comprising:
   a. creating a frame with a front side and a back side having a door shape;
   b. positioning a first polymer skin over the front side covering the front side;
   c. positioning a second polymer skin over the back side covering the back side, wherein the first and second polymer skins are spaced apart a width equivalent to a width of the frame;

d. forming a liquid hardenable flowable biofoam formulation, the biofoam formulation consisting of:
  (i) a plant based polyol from 20 weight percent to 60 weight percent based on the total liquid hardenable flowable biofoam formulation consisting of at least one of:
    1. a biomass content from 8 weight percent to 48 weight percent based on the total liquid hardenable flowable biofoam formulation, wherein the biomass content is selected from the group consisting of straw, ground pecan shells, cellulosic materials, silage, ground peanut shells, talc, and ground bagasse; and
    2. a plant based oil content from 8 weight percent to 92 weight percent based on the total liquid hardenable flowable biofoam formulation, wherein the plant based oil is one of a plant based renewable source and a non-fossil fuel source;
  (ii) a catalyst from 0.75 weight percent to 1.2 weight percent based on the total liquid hardenable flowable biofoam formulation, wherein the catalyst is at least one of an amine catalyst or a metal catalyst;
  (iii) a blowing agent from 2.0 weight percent to 6.0 weight percent based on the total liquid hardenable flowable biofoam formulation comprising at least one of: water, distilled water, oxygen, and atmospheric air;
  (iv) a surfactant from 1.1 weight percent to 1.4 weight percent based on the total liquid hardenable flowable biofoam formulation;
  (v) an isocyanate from 36 weight percent to 55 weight percent based on the total liquid hardenable flowable biofoam formulation;
  (vi) an antioxidant from 0.2 weight percent to 10 weight percent based on the total liquid hardenable flowable biofoam formulation;
  (vii) a filler from 0.2 weight percent to 10 weight percent based on the total liquid hardenable flowable biofoam formulation; and
  (viii) a crosslinking agent from 0.1 weight percent to 1.4 weight percent based on the total liquid hardenable flowable biofoam formulation;
e. injecting the liquid hardenable flowable biofoam formulation between the first and second polymer skins and the frame for a period of time from 2 seconds to 60 seconds; and
f. waiting from 1 minute to 10 minutes while the liquid hardenable flowable biofoam formulation expands within the frame and the polymer skins forming an expanded closed cell biofoam that simultaneously eliminates the formation of cavities between the first and second polymer skins and the frame, bonding the frame and the polymer skins to the expanded closed cell biofoam forming a door with increased sound deadening properties and increased insulation properties that is produced without retaining a toluene, a pentane, or a styrene in the liquid hardenable flowable biofoam formulation to make the door; wherein the bond between the biofoam, the frame and the polymer skins has a tensile strength that withstands a hurricane category force wind.

2. The biofoam door of claim 1, wherein the frame is at least one of: a polymer composite, a fiberglass, a wood, or a graphite polymer.

3. The biofoam door of claim 1, wherein the first and second polymer skins have aligned openings forming a door light.

4. The biofoam door of claim 1, wherein the liquid hardenable flowable biofoam formulation is 33 weight percent to 60 weight percent of a castor oil based polyol, 1.1 weight percent of a diethanol amine catalyst, 3 weight percent of water as the blowing agent, 1.1 weight percent of a detergent as the surfactant, and 36 weight percent of the isocyanate.

5. The biofoam door of claim 1, wherein the isocyanate is a methylene-based isocyanate.

6. The biofoam door of claim 1, wherein the plant based oil is at least one of: a castor oil, a soy oil, a palm oil, a peanut oil, a cotton oil, a jatropha oil and an algae oil.

7. The biofoam door of claim 1, wherein the surfactant is a detergent or a silicon surfactant.

8. The biofoam door of claim 1, wherein the antioxidant is used to prevent degradation of a color used in the biofoam.

9. The biofoam door of claim 1, wherein the filler is at least one of: an ash, a perlite, a clay, a silica, a biomass, a starch, a diatomaceous earth and a calcium carbonate.

10. The biofoam door of claim 1, wherein the crosslinking agent comprises at least one of: a triethanol amine, a diethanol amine, and an ethanol glycol.

* * * * *